United States Patent
Ichimura

(10) Patent No.: US 11,964,438 B1
(45) Date of Patent: Apr. 23, 2024

(54) THREE-DIMENSIONAL MOLDING METHOD

(71) Applicant: Matsuura Machinery Corporation, Fukui (JP)

(72) Inventor: Makoto Ichimura, Fukui (JP)

(73) Assignee: Matsuura Machinery Corporation, Fukui (JP)

( * ) Notice: Subject to any disclaimer, the term of this patent is extended or adjusted under 35 U.S.C. 154(b) by 0 days.

(21) Appl. No.: 18/375,013

(22) Filed: Sep. 29, 2023

(30) Foreign Application Priority Data

Oct. 25, 2022 (JP) ................. 2022-170284

(51) Int. Cl.
| | |
|---|---|
| *B29C 64/40* | (2017.01) |
| *B29C 64/153* | (2017.01) |
| *B29C 64/268* | (2017.01) |
| *B29C 64/30* | (2017.01) |
| *B33Y 10/00* | (2015.01) |
| *B33Y 40/20* | (2020.01) |

(52) U.S. Cl.
CPC ............ *B29C 64/40* (2017.08); *B29C 64/153* (2017.08); *B29C 64/268* (2017.08); *B29C 64/30* (2017.08); *B33Y 10/00* (2014.12); *B33Y 40/20* (2020.01)

(58) Field of Classification Search
CPC ..................................................... B29C 64/40
See application file for complete search history.

(56) References Cited

U.S. PATENT DOCUMENTS

| | | | | |
|---|---|---|---|---|
| 5,595,703 A | * | 1/1997 | Swaelens ............... | A61B 17/58 427/512 |
| 5,897,825 A | * | 4/1999 | Fruth .................... | B29C 64/153 264/401 |
| 6,841,589 B2 | * | 1/2005 | Schmidt ............... | B29C 64/106 523/160 |
| 7,084,370 B2 | * | 8/2006 | Hagemeister ............ | B22F 5/00 219/121.64 |
| 7,176,253 B2 | * | 2/2007 | Xu ......................... | B33Y 70/00 524/270 |
| 7,378,460 B2 | * | 5/2008 | Schmidt ................... | C08K 5/05 523/160 |
| 7,381,921 B2 | * | 6/2008 | Hagemeister ........... | B29C 64/40 219/121.64 |
| 7,399,796 B2 | * | 7/2008 | Xu ......................... | B33Y 70/00 524/270 |
| 8,684,069 B2 | * | 4/2014 | Mottin ................... | B22D 23/06 164/94 |

(Continued)

FOREIGN PATENT DOCUMENTS

| | | | | |
|---|---|---|---|---|
| CN | 107635751 A | * | 1/2018 | ............ B22F 10/47 |
| DE | 102010041461 A1 | * | 3/2012 | ......... B29C 67/0077 |

(Continued)

*Primary Examiner* — Timothy Kennedy
(74) *Attorney, Agent, or Firm* — Richard M. Goldberg

(57) ABSTRACT

A three-dimensional molding method in which both a support material 2 and a test piece 3 are separately joined to partial regions of a part to be produced 1, which is molded by dispersion of a powder by traveling of a squeegee and sintering of the powder by irradiation of a laser beam or an electron beam, or the test piece 3 is separately joined to a plurality of the support materials 2, or the test piece 3 is joined to a partial region of the part to be produced 1 to mold the support material 2 and the test pieces 3 in the same step.

14 Claims, 8 Drawing Sheets

(56) References Cited

U.S. PATENT DOCUMENTS

| | | | |
|---|---|---|---|
| 8,980,150 B2* | 3/2015 | Oshima | B32B 5/16 264/308 |
| 9,109,979 B2* | 8/2015 | Dietrich | B29C 64/40 |
| 9,116,428 B1* | 8/2015 | Jacobsen | B32B 3/12 |
| 9,399,323 B1* | 7/2016 | Lu | B33Y 30/00 |
| 9,689,783 B2* | 6/2017 | Dietrich | G01N 3/08 |
| 9,707,718 B2* | 7/2017 | Vilaro | B29C 64/153 |
| 10,191,476 B2* | 1/2019 | Revanur | B33Y 50/02 |
| 10,307,979 B2* | 6/2019 | Blanchet | B23K 15/0086 |
| 10,315,252 B2* | 6/2019 | Symeonidis | B23K 15/0093 |
| 10,456,981 B2* | 10/2019 | Iwase | B29C 64/40 |
| 10,464,131 B2* | 11/2019 | Mark | B33Y 70/00 |
| 10,486,362 B2* | 11/2019 | Alcantara Marte | B33Y 40/20 |
| 10,556,384 B2* | 2/2020 | Mark | B29C 64/40 |
| 10,799,951 B2* | 10/2020 | Joerger | B22F 10/47 |
| 10,828,699 B2* | 11/2020 | Mercelis | B22F 10/47 |
| 10,899,088 B2* | 1/2021 | Amaya | B29C 67/0011 |
| 11,097,497 B2* | 8/2021 | Amaya | B29C 67/0011 |
| 11,117,329 B2* | 9/2021 | Franzen, Jr. | B33Y 10/00 |
| 11,173,668 B2* | 11/2021 | Stevenson | B29C 64/153 |
| 2003/0092820 A1 | 5/2003 | Schmidt | B33Y 10/00 524/487 |
| 2003/0100658 A1* | 5/2003 | Xu | B33Y 10/00 524/270 |
| 2004/0031780 A1* | 2/2004 | Hagemeister | B22F 5/00 219/121.85 |
| 2004/0242728 A1* | 12/2004 | Xu | B29C 64/112 523/160 |
| 2005/0080163 A1* | 4/2005 | Schmidt | C08K 5/05 523/160 |
| 2006/0186101 A1* | 8/2006 | Hagemeister | B22F 10/28 219/121.85 |
| 2009/0039570 A1* | 2/2009 | Clark | B29C 64/153 264/653 |
| 2009/0261067 A1* | 10/2009 | Dietrich | B26F 3/004 216/83 |
| 2011/0137578 A1* | 6/2011 | Dietrich | B22F 10/47 73/826 |
| 2012/0018926 A1* | 1/2012 | Mannella | B33Y 10/00 425/73 |
| 2012/0113439 A1* | 5/2012 | Ederer | C22C 1/1084 358/1.9 |
| 2013/0312928 A1* | 11/2013 | Mercelis | B22F 5/00 164/492 |
| 2014/0367367 A1* | 12/2014 | Wood | B22F 10/47 219/76.12 |
| 2015/0308935 A1* | 10/2015 | Dietrich | B29C 64/40 73/826 |
| 2015/0360421 A1* | 12/2015 | Burhop | G05B 19/4097 700/98 |
| 2016/0243620 A1* | 8/2016 | Butcher | B23K 15/0086 |
| 2016/0311024 A1* | 10/2016 | Thiel | B29C 64/40 |
| 2017/0113413 A1* | 4/2017 | Iwase | B29C 64/40 |
| 2017/0232512 A1* | 8/2017 | Joerger | B22F 10/47 419/53 |
| 2017/0232683 A1* | 8/2017 | Alcantara Marte | B22F 10/47 264/497 |
| 2018/0001570 A1* | 1/2018 | Cahn | B33Y 40/20 |
| 2018/0162062 A1* | 6/2018 | Mark | B22F 10/47 |
| 2018/0304541 A1* | 10/2018 | Barth | B29C 64/135 |
| 2019/0152163 A1* | 5/2019 | Amaya | B29C 64/165 |
| 2019/0160734 A1* | 5/2019 | Biesboer | C08L 23/06 |
| 2020/0061920 A1* | 2/2020 | Debora | B29C 64/393 |
| 2020/0180237 A1* | 6/2020 | Amaya | B29C 67/0011 |
| 2021/0372896 A1* | 12/2021 | Ertl | G01N 3/24 |

FOREIGN PATENT DOCUMENTS

| | | | | |
|---|---|---|---|---|
| GB | 2479616 A | * | 10/2011 | B22F 3/008 |
| JP | 2014-83744 A | | 5/2014 | |
| JP | 2015-82043 A | | 4/2015 | |
| JP | 2019-111803 A | | 7/2019 | |
| JP | 2019-217517 A | | 12/2019 | |
| WO | WO-2014208743 A1 | * | 12/2014 | B22F 3/008 |
| WO | WO-2015040410 A2 | * | 3/2015 | B22F 3/1055 |
| WO | WO-2017041882 A1 | * | 3/2017 | B22F 3/1055 |

* cited by examiner

[Fig. 1]
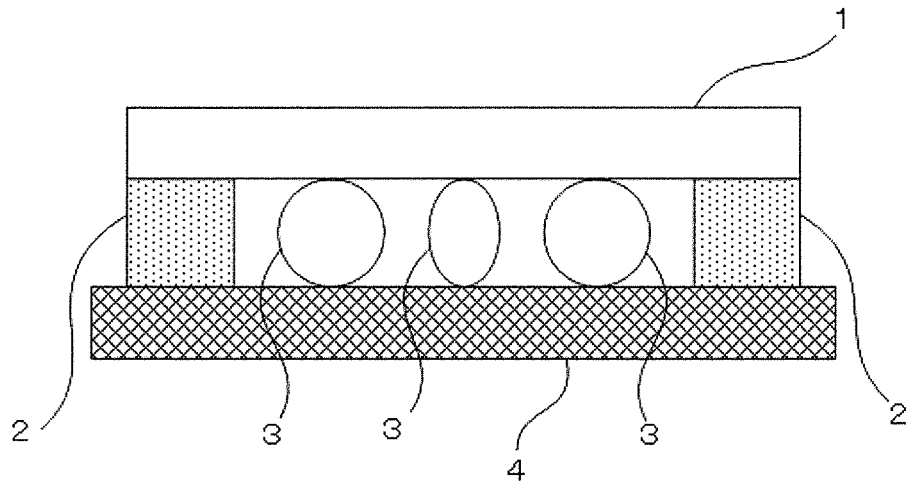
[Fig. 2]
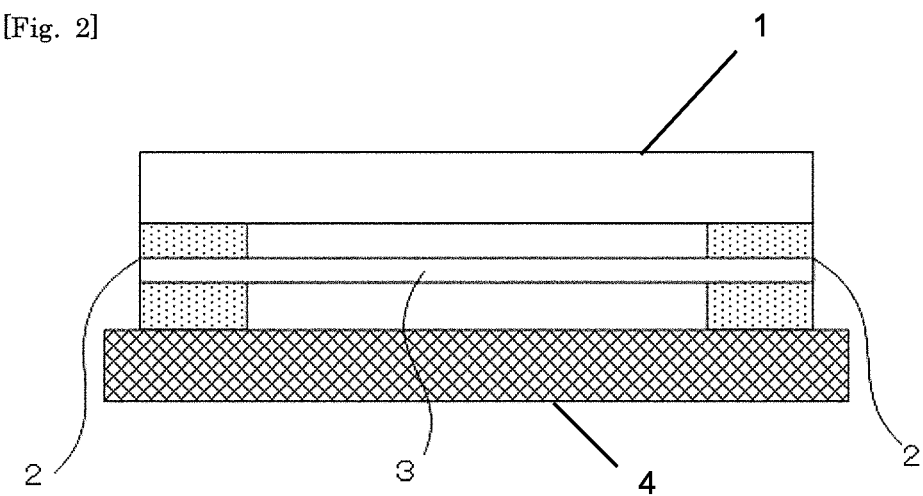
[Fig. 3]
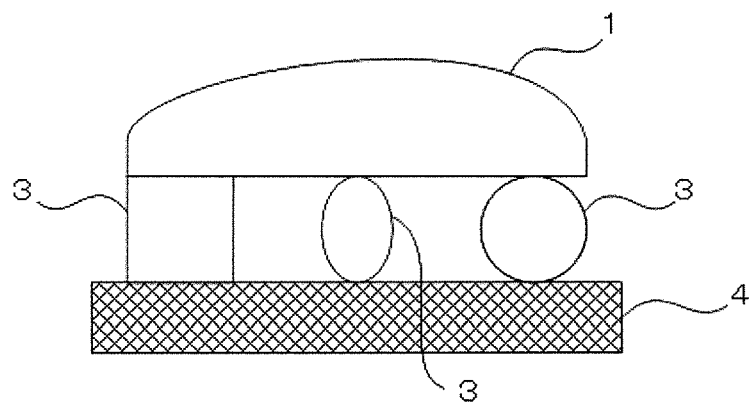

[Fig. 4 (a)]
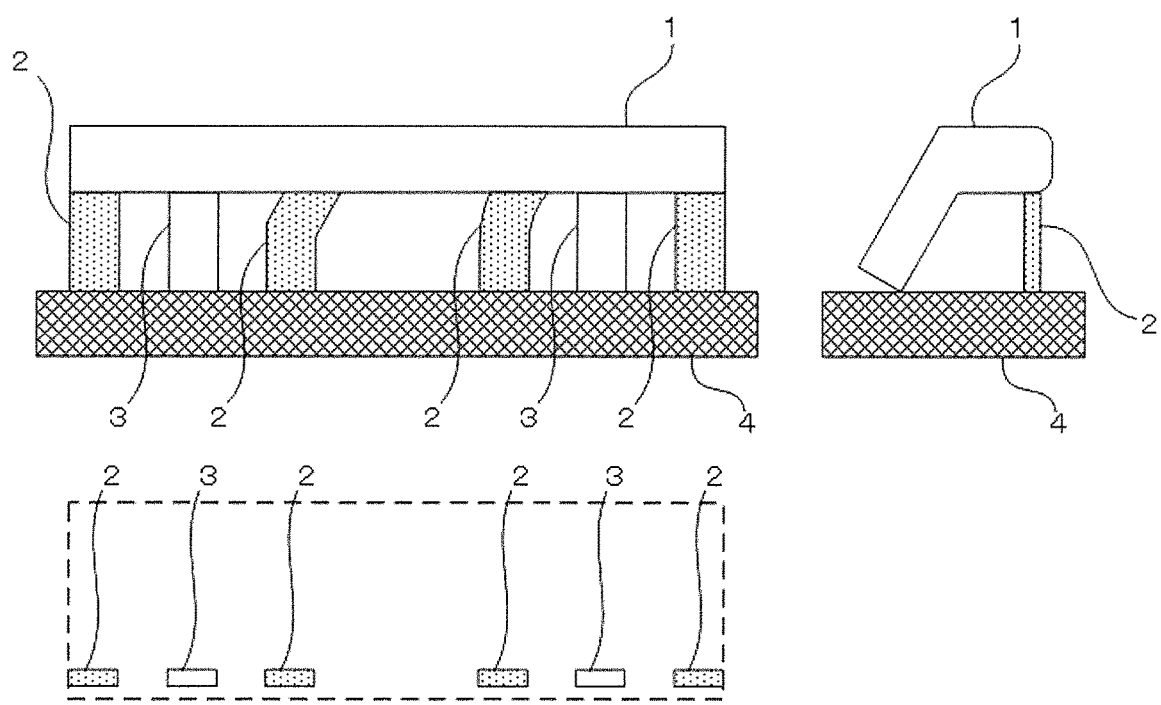

[Fig. 4 (b)]
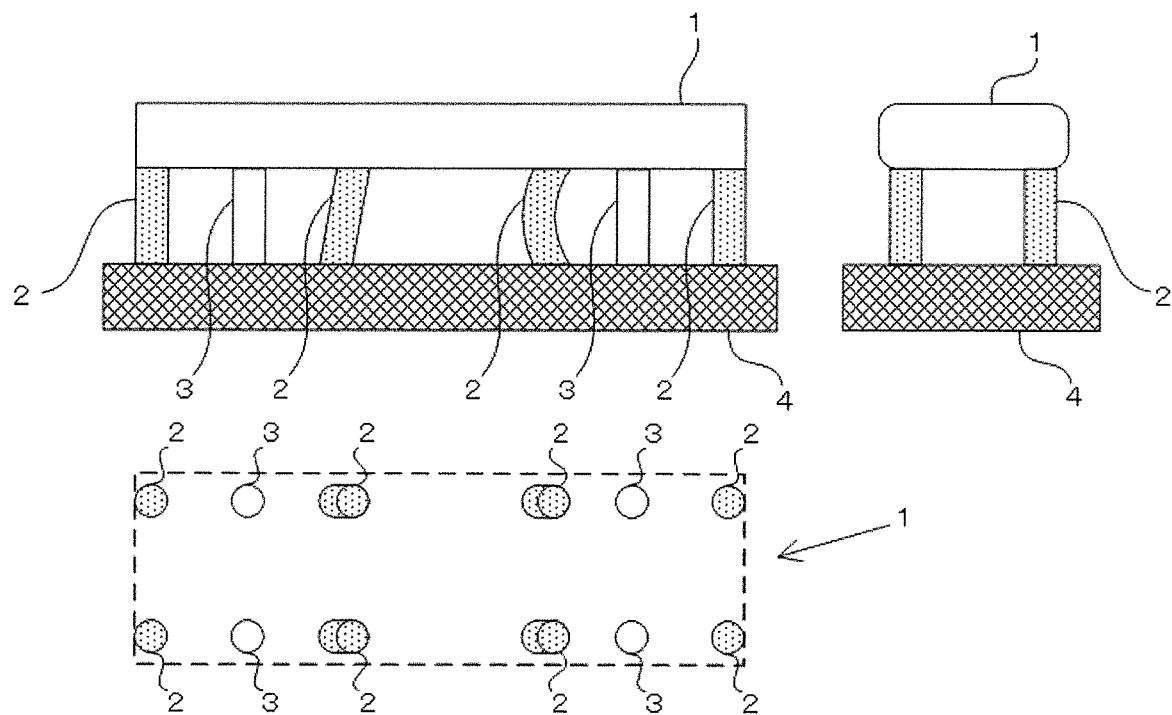

[Fig. 5]
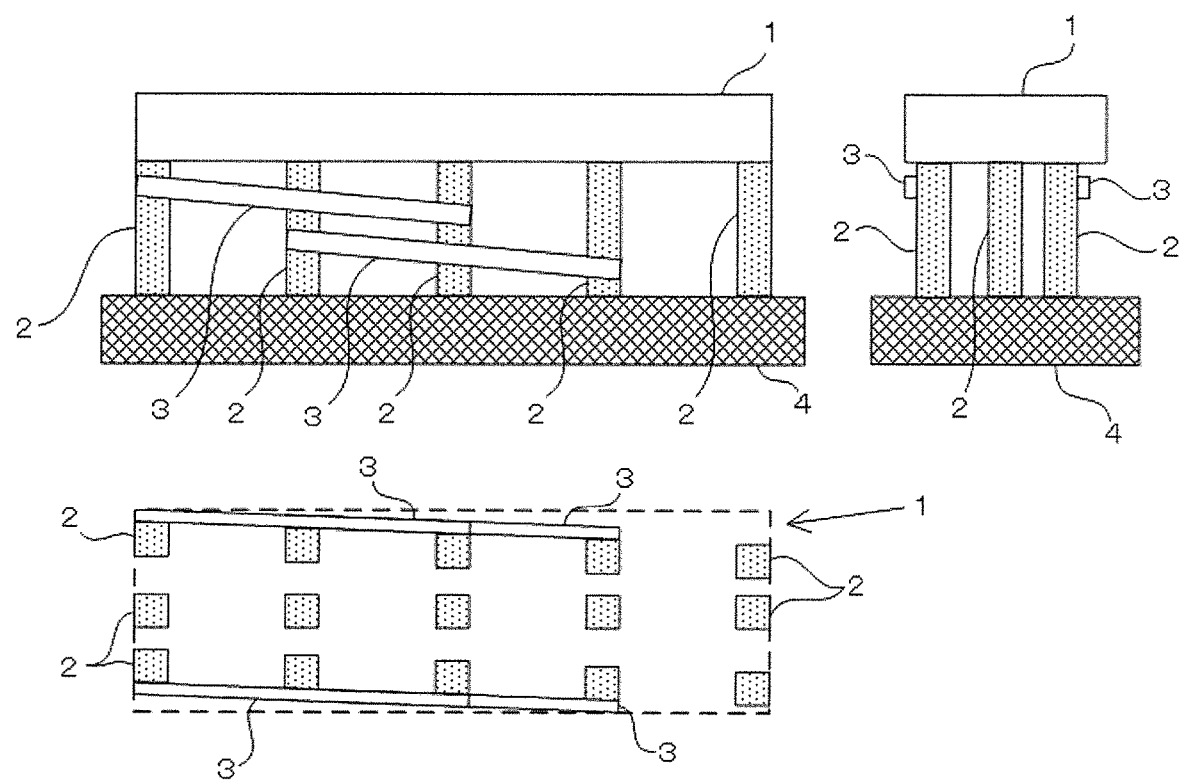

[Fig. 6 (a)]
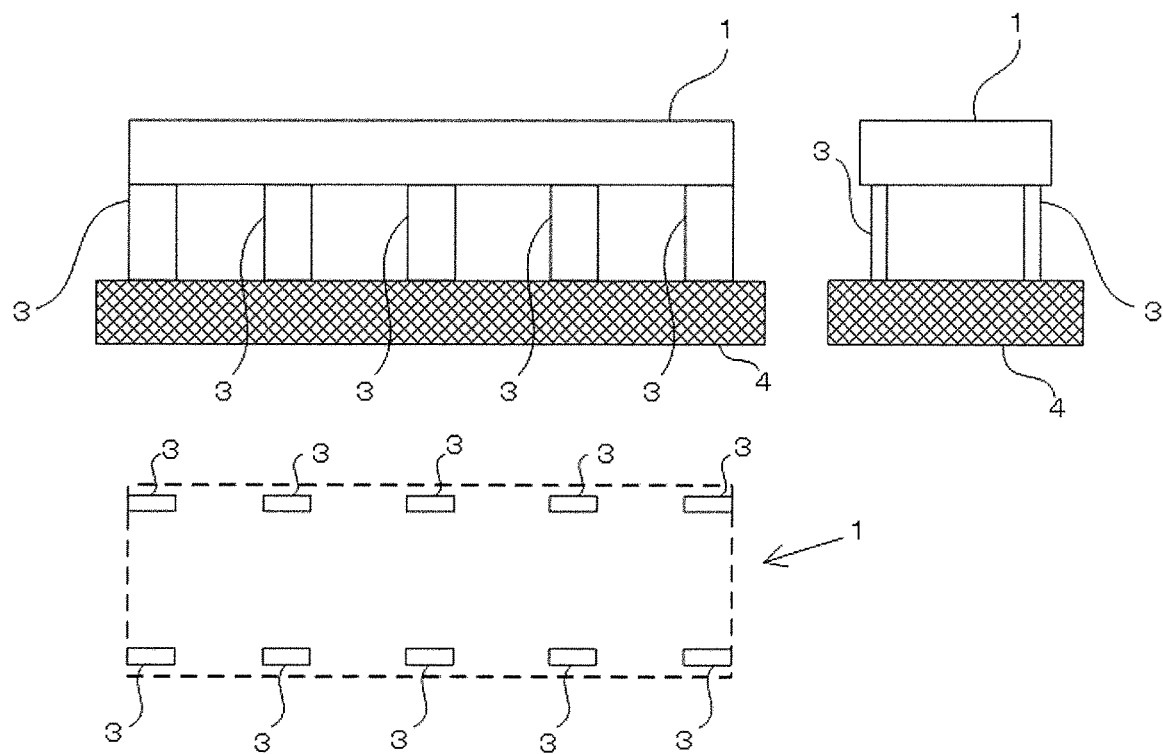

[Fig. 6 (b)]
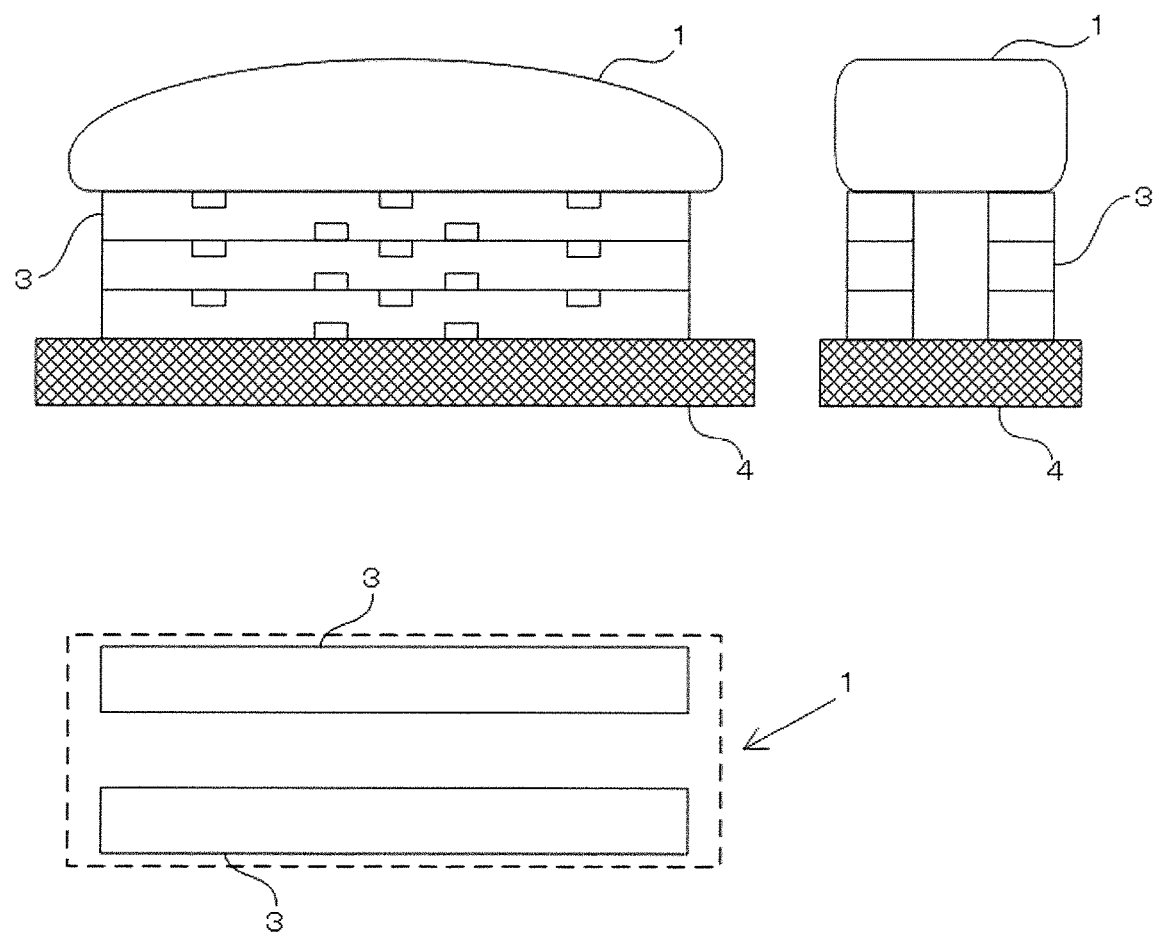

[[Fig. 6 (c)]]
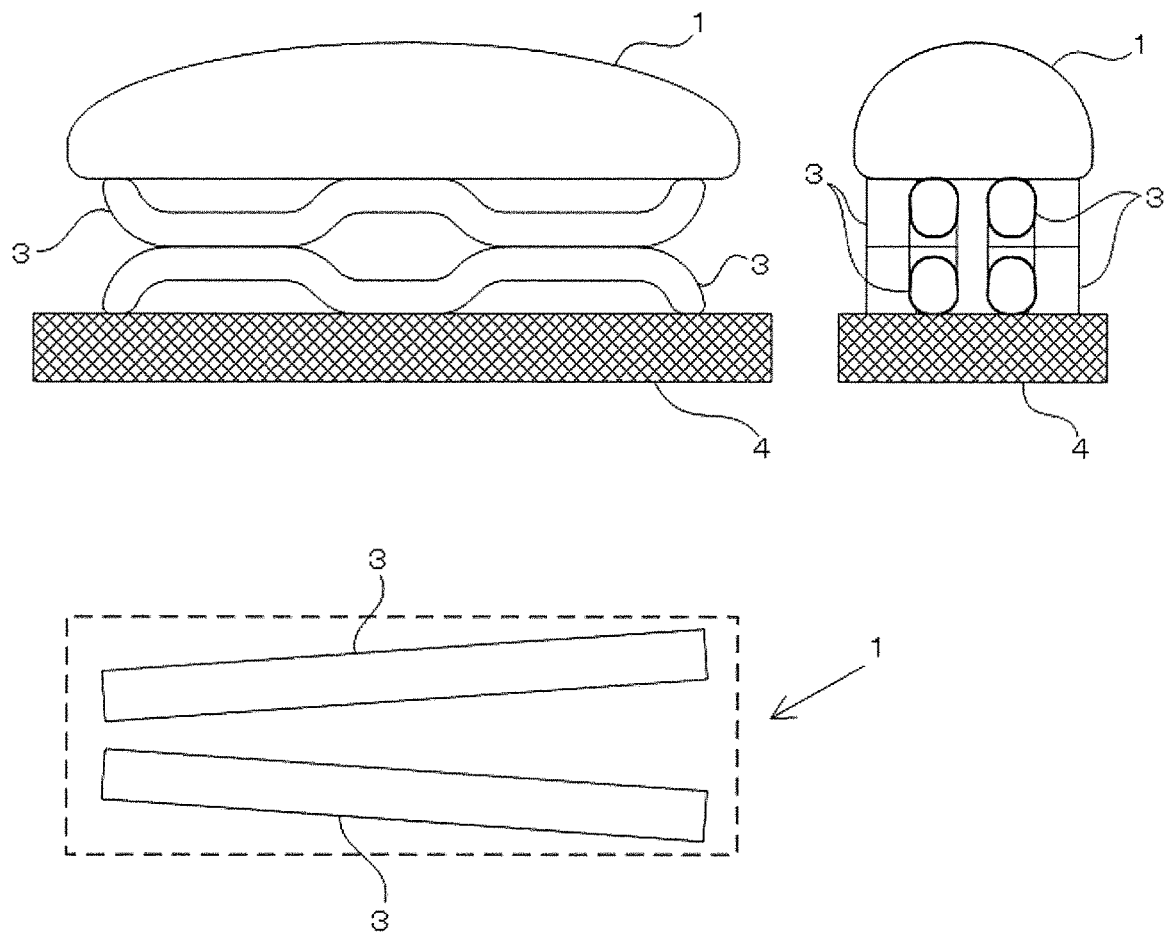

[Fig. 6 (d)]
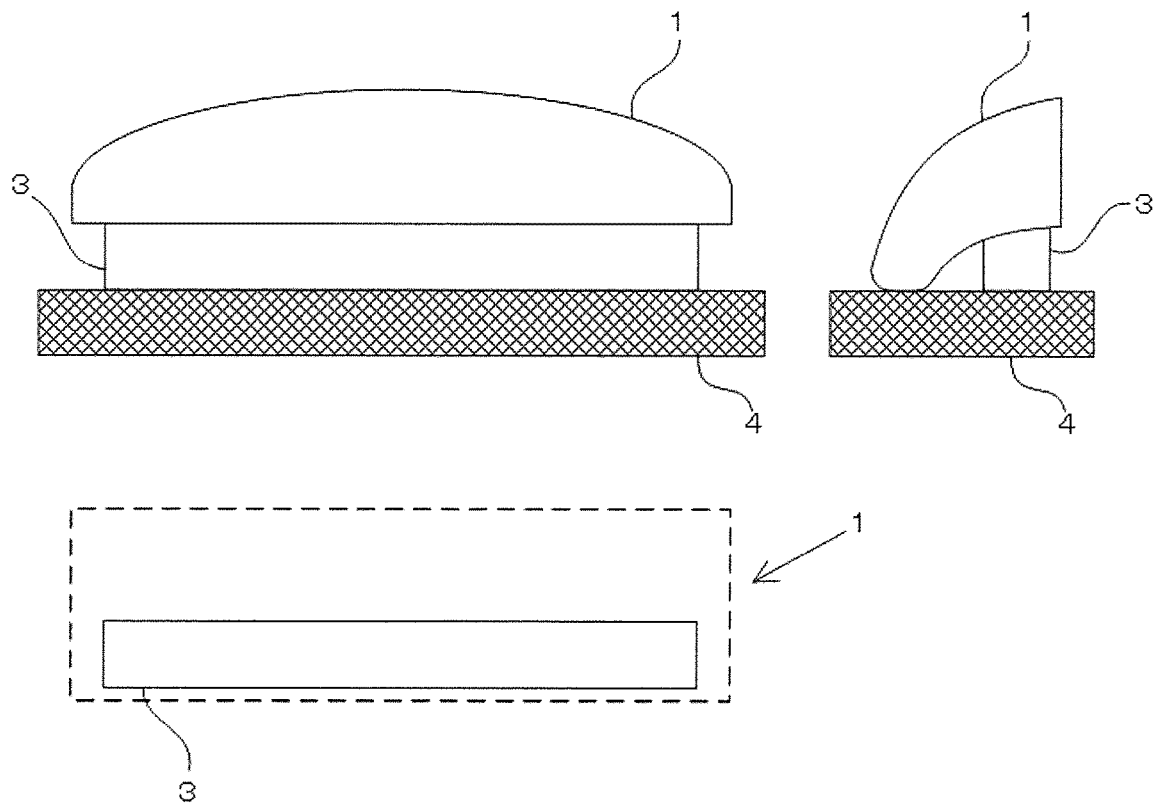
[Fig. 7]
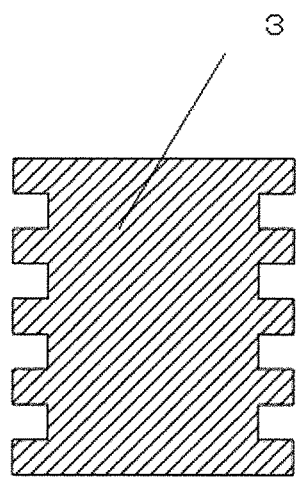

THREE-DIMENSIONAL MOLDING METHOD

TECHNICAL FIELD

The present invention relates to a three-dimensional molding method wherein a part to be produced and a support material and a test piece supporting the part to be produced from below, are simultaneously molded in the same step.

BACKGROUND OF THE INVENTION

In the prior art, a part to be produced is supported by a support material made of the same material as the part to be produced, on a base plate, usually with the support material having weaker sintering strength than the part to be produced, while not being supported by a test piece which is made of the same material as the part to be produced and in the same sintered state as the part to be produced and is to be used for measurement of the plastic deformation strength per unit volume of the part to be produced, and the density of the part to be produced.

Moreover, even though the part to be produced, the test piece and the support material of the prior art are subjected to the same steps for three-dimensional molding which employs steps including dispersion of the powder by traveling of a squeegee and sintering by irradiation with a laser beam or an electron beam, the test piece is molded in an independently separated state from the part to be produced and support material.

For reference, in the embodiment shown in FIG. 1 of Patent Document 1 as a developing solution composition for a 3D printer shaped product according to that invention, the wrench used for both the part to be produced and test piece is mounted on the support material, but is completely separate from the support material.

In Patent Document 2, relating to an invention of a method for fabricating a preoperative planned bone model, if three-dimensional molding is assumed, then the part to be produced by the bone model shown in FIG. 8 is molded while being joined to the support material, whereas the test piece shown in FIG. 9 is molded while being mutually separate from the part to be produced and the support material.

In such a separated state, however, the part to be produced, support material and test piece are subjected to three-dimensional molding in separate forms, making it impossible to realize efficient molding and efficient use of the powder necessary for three-dimensional molding.

In the prior art, therefore, which includes Patent Document 1 and Patent Document 2, the test piece is subjected to the three-dimensional molding in an independently isolated state from the part to be produced and support material, making it impossible to carry out efficient molding and to efficiently utilize the powder.

PRIOR ART DOCUMENTS

Patent Documents

[Patent document] Japanese Published Unexamined Patent Application No. 2014-83744
[Patent document] Japanese Published Unexamined Patent Application No. 2015-82043

SUMMARY OF INVENTION

Technical Problem

It is an object of the present invention to provide a three-dimensional molding method wherein for three-dimensional molding of a part to be produced, and a support material, a test piece, the test piece either supports the part to be produced, or is molded integrally with the support material supporting the part to be produced, thereby allowing efficient molding and efficient utilization of the powder.

Solution to Problem

In order to solve the aforementioned problem, the basic construction of the invention comprises the following basic constructions (1), (2) and (3).

(1) A three-dimensional molding method in which molding is based on dispersion of a powder by traveling of a squeegee on the upper side of a base plate and sintering of the powder by irradiation of a laser beam or an electron beam, and a part to be produced and a support material and a test piece supporting the part to be produced are molded in the same step, wherein the molding is carried out with both the support material and the test piece separately joined to partial regions of the part to be produced.

(2) A three-dimensional molding method in which molding is based on dispersion of a powder by traveling of a squeegee on the upper side of a base plate and sintering of the powder by irradiation of a laser beam or an electron beam, and a part to be produced and a support material and a test piece supporting the part to be produced, are molded in the same step, wherein the molding is carried out with a plurality of the support materials separately joined to partial regions of the part to be produced, and with the test piece joined to the support materials.

(3) A three-dimensional molding method in which molding is based on dispersion of a powder by traveling of a squeegee on the upper side of a base plate and sintering of the powder by irradiation of a laser beam or an electron beam, and a part to be produced and a test piece supporting the part to be produced are molded in the same step, wherein the molding is carried out with the test piece being joined to partial regions of the part to be produced by one or more units.

Advantageous Effects of Invention

In basic construction (1), the test piece is joined to partial regions of the part to be produced, together with the support material, while in basic construction (2), it is joined to the support material that is joined to the partial regions of the part to be produced, thus being integrally molded, instead of molding with the part to be produced and the support material being independently isolated as in the prior art.

As a result, the test piece is mutually joined with the part to be produced or support material, thus shortening the mean distance between the test piece and the part to be produced and support material, and allowing molding to be accomplished more speedily and efficiently.

Moreover, such shortening of the mean distance also conserves the powder material serving as the material for three-dimensional molding, thus allowing the powder material to be used more efficiently.

In basic construction (3), the test piece provides the same support function as the support material, without employing an actual support material, with molding being carried out with the test piece joined to the partial regions of the part to be produced, similar to basic construction (1).

Thus, basic construction (3) accomplishes efficient molding and efficient use of the powder material similar to basic constructions (1) and (2), while also having a much simpler design than basic constructions (1) and (2) by not requiring separate designs for the support material and test piece.

Moreover, since basic construction (3) provides support of the part to be produced by the test piece alone as explained above, it further aids in accomplishing efficient molding and efficient use of the powder material.

For reference, the sintering strength of the test piece needs to be the same as that of the part to be produced and generally greater than that of the support material, and therefore the part to be produced can be supported by a material with lower strength than for support by the support material+the test piece according to basic constructions (1) and (2).

Basic constructions (1), (2) and (3) employ a support structure with joining of the support material and test piece with partial regions of the part to be produced, because efficient molding and efficient use of the powder material is not possible when support is made by joining over the entire region.

BRIEF DESCRIPTION OF DRAWINGS

FIG. 1 is a side view of a structure according to basic construction (1).

FIG. 2 is a side view of a structure according to basic construction (2).

FIG. 3 is a side view of a structure according to basic construction (3).

FIG. 4(a) is a view of basic construction (1), showing side views in two perpendicular directions of an embodiment in which the partial regions of the part to be produced are supported by the support materials and test pieces as plates or columns with their lengthwise directions in the vertical direction, as well as a top see-through view of the part to be produced. The dotted lines representing the part to be produced indicate the see-through state, as also used in FIG. 4(b), FIG. 5 and FIGS. 6(a), (b) (c) and (d).

FIG. 4(b) is a view of basic construction (1), showing side views in two perpendicular directions of an embodiment in which the partial regions of the part to be produced are supported by the support materials as plates or columns with their lengthwise directions in the vertical direction, as well as a top see-through view of the part to be produced.

FIG. 5 is a view of basic construction (2), showing side views in two perpendicular directions of an embodiment in which partial regions of the part to be produced are supported by the support materials as plates or columns with their lengthwise directions in the vertical direction, and the test piece is erected by being joined in a manner crossing with the support material, as well as a top see-through view of the part to be produced.

FIG. 6(a) is a view of basic construction (3), showing side views in two perpendicular directions of an embodiment in which the partial regions of the part to be produced are supported by the test pieces as plates or columns with their lengthwise directions in the vertical direction, and arranged in the horizontal direction, as well as a top see-through view of the part to be produced.

FIG. 6(b) is a view of basic construction (3), showing side views in two perpendicular directions of an embodiment in which the partial regions of the part to be produced are supported from below by a plurality of laminar or columnar test pieces with their lengthwise directions in the horizontal direction, as well as a top see-through view of the part to be produced.

FIG. 6(c) is a view of basic construction (3), showing side views in two perpendicular directions of an embodiment in which the partial regions of the part to be produced are supported from below by a plurality of laminar or columnar test pieces curved with their lengthwise directions in the horizontal direction and a slanted direction crossing the horizontal direction, as well as a top see-through view of the part to be produced.

FIG. 6(d) is a view of basic construction (3), showing side views in two perpendicular directions of an embodiment in which the part to be produced is supported from below by a single test piece, as well as a top see-through view of the part to be produced.

FIG. 7 is a cross-sectional view showing the structure of the Example.

DESCRIPTION OF THE PREFERRED EMBODIMENTS

Basic construction (1), as shown in FIG. 1, is a three-dimensional molding method in which molding is based on dispersion of a powder by traveling of a squeegee on the upper side of a base plate 4 and sintering of the powder by irradiation of a laser beam or an electron beam, and a part to be produced 1 and a support material 2 and a test piece 3 supporting the part to be produced 1 are molded in the same step, wherein the molding is carried out with both the support material 2 and the test piece 3 separately joined to partial regions of the part to be produced 1.

Basic construction (2), as shown in FIG. 2, is a three-dimensional molding method in which molding is based on dispersion of a powder by traveling of a squeegee on the upper side of a base plate 4 and sintering of the powder by irradiation of a laser beam or an electron beam, and a part to be produced 1 and a support material 2 and a test piece 3 supporting the part to be produced 1 are molded in the same step, wherein the molding is carried out with a plurality of the support materials 2 separately joined to partial regions of the part to be produced 1, and the test piece 3 joined to the support materials 2.

The advantages of the techniques of basic constructions (1) and (2) were explained above under "Advantageous Effects of Invention."

The shapes of the support material 2 and the test piece 3 for basic constructions (1) and (2) are not particularly restricted.

However, typically suitable examples are plates such as shown in FIG. 4(a), or columns such as shown in FIG. 4(b) and FIG. 5, or cubes, spheres or ovals such as shown in FIG. 1.

In basic construction (1), as shown in FIG. 4(a) and FIG. 4(b), an embodiment may be employed wherein partial regions of the part to be produced 1 are supported from below with one or a plurality of the support materials 2 consisting of plates or columns with their lengthwise directions in the vertical direction, and one or more test pieces 3 consisting of plates or columns with their lengthwise directions in the vertical direction, each being arranged in the horizontal direction, and the number of the support materials 2, and units where the test pieces 3 are arranged in the horizontal direction, is one, or else more than one in a parallel or non-parallel state.

In the embodiment shown in FIG. 4(a) and FIG. 4(b), the support materials 2 in the vertical direction and the test pieces 3 in the vertical direction allow a support structure to be provided for the part to be produced 1, using a variety of combinations.

The vertical direction for this embodiment is not limited to a straight linear vertical direction, and some parts may have a slanted direction or curved shape, as illustrated in the support materials 2 of FIG. 4(*a*), or all may have a slanted direction or curved shape.

In basic construction (2), as shown in FIG. 5, an embodiment may be employed wherein the partial regions of the part to be produced 1 are supported in the vertical direction by a plurality of the support materials 2 consisting of plates or columns with their lengthwise directions in the vertical direction, arranged in the horizontal direction, with the number of units formed in the lengthwise direction oriented in the vertical direction being one or more, while one or more test pieces 3 are erected by being joined in a crossing manner to all or part of the plurality of the support materials 2.

This embodiment corresponds to the case that the support materials 2 separately joined to partial regions of the part to be produced 1, with molding being carried out with the test pieces 3 joined to the support materials 2, and this embodiment allows the test pieces 3 to be easily used by cutting removal of the test pieces 3 from the support materials 2, while they are erected in a manner crossing the support materials 2.

In the embodiments shown in FIGS. 4(*a*) and (*b*) and FIG. 5, the number of units consisting of plates or columns arranged in the horizontal direction is one, or more than one in a parallel or non-parallel state, with FIG. 4(*a*) showing one, FIG. 4(*b*) showing two in parallel, and FIG. 5 showing three with the arrangement directions of rows adjacent in the horizontal direction being mutually parallel.

The case with one unit has a simple construction, and allows efficient molding and efficient use of the powder material.

The case with multiple units allows mounting of the part to be produced 1 in a stable state.

In basic construction (3), as shown in FIG. 3, three-dimensional molding method is carried out in which molding is based on dispersion of a powder by traveling of a squeegee on the upper side of a base plate 4 and sintering of the powder by irradiation of a laser beam or an electron beam, and a part to be produced 1 and a test piece 3 supporting the part to be produced 1 are molded in the same step, wherein the molding is carried out with the test piece 3 being joined to partial regions of the part to be produced 1 by one or more units.

The advantages of the techniques of basic construction (3) were explained above under "Advantageous Effects of Invention," with comparison to the effects of basic constructions (1) and (2).

The shapes of the test pieces 3 in basic construction (3) are not particularly restricted.

However, typically suitable examples are plate shapes such as shown in FIGS. 6(*a*), (*b*) and (*d*), or columnar shapes such as shown in FIG. 6(*c*), or shapes such as cubes, spheres or ovals such as shown in FIG. 3.

In basic construction (3), as shown in FIG. 6(*a*), an embodiment may be employed wherein partial regions of the part to be produced 1 are separately supported from below by a plurality of test pieces 3 consisting of plates or columns with their lengthwise directions in the vertical direction, each being arranged in the horizontal direction, and the number of units where the test pieces 3 are arranged in the horizontal direction, is one, or else more than one in a parallel or non-parallel state.

This embodiment is common with the embodiments shown in FIG. 4(*a*) and FIG. 4(*b*) in that the test pieces 3 are in the lengthwise direction or vertical direction.

However, since the material supporting the part to be produced 1 consists entirely of test pieces 3 without support materials 2, a simpler design may be achieved compared to the embodiments of FIG. 4(*a*) and FIG. 4(*b*).

Moreover, in the case of test pieces 3 sintered to the same degree as the part to be produced 1, since the degree of sintering is greater than the support materials 2, the number of test pieces 3 for this embodiment can be reduced compared to the number of the support materials 2+the test pieces 3 for the embodiment of FIG. 4(*a*), resulting in more efficient molding and more efficient use of the powder material compared to aforementioned embodiment.

In basic construction (3), as shown in FIG. 6(*b*), an embodiment may be employed wherein partial regions of the part to be produced 1 are supported from below by a plurality of test pieces 3 forming voids by rugged shape on both side surfaces by plates or columns with their lengthwise directions in the horizontal direction, and the number of units where the test pieces 3 are formed in the lengthwise direction is one, or else more than one in a parallel or non-parallel state.

In this embodiment, the shapes of the test pieces 3 in the lengthwise direction may be along the lengthwise direction as the horizontal direction of the part to be produced 1, allowing a simpler design from a different technical standpoint than the embodiment shown in FIG. 6(*a*).

Furthermore, since voids are formed mutually by rugged shape between the test pieces 3 along the horizontal direction, the powder material used for three-dimensional molding can be conserved.

In basic construction (3), as shown in FIG. 6(*c*), an embodiment may be employed wherein partial regions of the part to be produced 1 are supported from below by a plurality of laminar or columnar test pieces 3 curved by having their lengthwise directions in the horizontal direction and a slanted direction crossing the horizontal direction, and the number of units where the test pieces 3 are formed in the lengthwise direction is one, or else more than one in a parallel or non-parallel state.

In this embodiment as well, the shapes of the test pieces 3 along the horizontal direction may follow the part to be produced 1, allowing a simple construction similar to the embodiment shown in FIG. 6(*b*).

Furthermore, curved test pieces 3 necessarily form voids in the vertical direction, allowing the powder material to be conserved, similar to the embodiment shown in FIG. 6(*b*).

In basic construction (3), as shown in FIG. 6(*d*), an embodiment may be employed wherein a partial region of the part to be produced 1 is supported from below by one test piece 3 consisting of a plate or a column with the lengthwise direction in the horizontal direction, and the number of units where the test pieces 3 are formed in the lengthwise direction is one, or else more than one in a parallel or non-parallel state.

In this case, since the test piece 3 has only one vertical direction, an even simpler design can be realized over the embodiments of FIGS. 6(*b*) and (*c*).

In these embodiments, a construction may naturally be employed in which voids are formed on the surface similar to the embodiment shown in FIG. 6(*b*), forming voids between the part to be produced 1 and the base plate 4.

In the embodiments shown in FIGS. 6(*a*), (*b*), (*c*) and (*d*), the number of units consisting of plates or columns arranged in the horizontal direction (as in FIG. 6(*a*)), or the number of units consisting of columns or cylinders formed in the lengthwise direction (as in FIGS. 6(b), (c) and (d)), are limited to one, or more than one in a parallel or non-parallel state, but a single unit can provide a simpler structure, while a plurality of units can provide support of the part to be produced 1 in a more stable state.

FIG. 6(d) shows a single unit, FIGS. 6(a) and (b) show two units that are parallel, and FIG. 6(c) shows two units that are non-parallel.

For the three-dimensional molding methods according to basic constructions (1), (2) and (3), additional steps may also be employed after sintering of the powder.

Specifically, it is common to employ an embodiment in which the sintering step is followed by a molding step by a removal process on the sintered surface using a rotary tool.

The removal process may be used for the part to be produced 1, all of the support materials 2 and the test pieces 3, or only for the part to be produced 1 and the test pieces 3, and not for the support materials 2.

Such an embodiment will allow molding to more precise shapes.

An example of the invention will now be described.

Example

In this Example, rugged shape is formed in the area surface of the test piece 3, according to basic constructions (1), (2) and (3), as shown in FIG. 7.

By thus setting rugged shape in the surface, it is possible to conserve and efficiently use the powder material as the raw material for the test piece 3 in this Example.

However, when the test piece 3 is intended to be used as a test piece for determining plastic deformation strength per unit volume, the rugged shape must be of a depth that does not hinder measurement of plastic deformation.

When the test piece 3 is to be used as a test piece for determining density, the depths of the rugged shape is not so restricted.

The rugged shape shown in FIG. 7 may be either or both line shape and independent interspersed shape surrounding the test piece 3.

INDUSTRIAL APPLICABILITY

The present invention based on basic constructions (1), (2) and (3) is revolutionary in that these constructions make it possible to accomplish efficient molding of a part to be produced, the support material and the test piece, and to efficiently use powder material required for three-dimensional molding, and it is therefore expected to have high utility in the field of three-dimensional molding.

REFERENCE SIGNS LIST

1: Part to be produced
2: Support material
3: Test piece
4: Base plate

What is claimed is:

1. A three-dimensional molding method comprising the steps of:
   molding a support material and a test piece supporting a part to be produced in the same step, based on dispersion of a powder by traveling of a squeegee on an upper side of a base plate and sintering of the powder by irradiation of a laser beam or an electron beam, the part to be produced having a sintered surface, the step of molding including the steps of:
   molding the support material of the same material as the part to be produced and in a sintered strength which is weaker than a sintered strength of the part to be produced, and
   molding the test piece of the same material as the part to be produced and in the same sintered strength as the part to be produced, such that the test piece is to be used for measurement of plastic deformation strength per unit volume of the part to be produced, and density of the part to be produced, and
   carrying out the step of molding with both the support material and the test piece separately joined to partial regions of the part to be produced.

2. A three-dimensional molding method comprising the steps of:
   molding a part to be produced and a support material and supporting the part to be produced and a test piece in the same step based on dispersion of a powder by traveling of a squeegee on an upper side of a base plate and sintering of the powder by irradiation of a laser beam or an electron beam, the part to be produced having a sintered surface, the step of molding including the steps of:
   molding the entire support material of the same material as the part to be produced and in a sintered strength which is weaker than a sintered strength of the part to be produced, and
   molding the entire test piece of the same material as the part to be produced and in the same sintered strength as the part to be produced, such that the test piece is to be used for measurement of plastic deformation strength per unit volume of the part to be produced, and density of the part to be produced, and
   carrying out the step of molding by separately joining a plurality of the support materials to partial regions of the part to be produced, and joining the test piece to the support material.

3. The three-dimensional molding method according to claim 2, further comprising the step of:
   supporting the partial regions of the part to be produced in the vertical direction by the plurality of the support materials including one of plates or columns with lengthwise directions thereof in the vertical direction, and arranged in spaced relation in the horizontal direction, with at least one unit of the support materials formed in the lengthwise direction oriented in the vertical direction, and
   erecting at least one test piece joined in a crossing manner to at least part of the plurality of the support materials.

4. The three-dimensional molding method according to claim 1, wherein the support material and the test piece are each selected from one of the following shapes:
   plates,
   laminar,
   columnar,
   cuboid,
   spherical or
   elliptical.

5. The three-dimensional molding method according to claim 4, further comprising the step of supporting the partial regions of the part to be produced from below with:
   at least one of the support materials including one of plates or columns with lengthwise directions thereof in the vertical direction, and at least one test piece including one of plates or columns with lengthwise directions thereof in the vertical direction, each being arranged in spaced relation in the horizontal direction, and the number of the support materials, and units where the at least one test piece is arranged in the horizontal direction, is at least one, in one of a parallel or non-parallel state.

6. A three-dimensional molding method comprising the steps of:

molding a part to be produced and a test piece supporting the part to be produced in the same step, based on dispersion of a powder by traveling of a squeegee on an upper side of a base plate and sintering of the powder by irradiation of a laser beam or an electron beam, the part to be produced having a sintered surface and the test piece being connected between the part to be produced and the base plate, wherein the entire test piece extending between the part to be produced and the base plate is made of the same material as the part to be produced and in a same sintered strength as the part to be produced without employing any support material having a sintered strength which is weaker than a sintered strength of the part to be produced, and the test piece is to be used for measurement of plastic deformation strength per unit volume of the part to be produced and density of the part to be produced, and carrying out the step of molding with the test piece being joined to partial regions of the part to be produced by at least one unit.

7. The three-dimensional molding method according to claim 6, wherein the test piece is selected from one of the following shapes:

plates,
laminar,
columnar,
cuboid,
spherical or
elliptical.

8. The three-dimensional molding method according to claim 7, further comprising the step of:

separately supporting partial regions of the part to be produced from below by each of a plurality of test pieces including one of plates or columns with lengthwise directions thereof in the vertical direction, and arranged in spaced relation in the horizontal direction, and the number of units where the test piece is arranged in the horizontal direction, is at least one in one of a parallel or non-parallel state.

9. The three-dimensional molding method according to claim 7, further comprising the step of:

supporting partial regions of the part to be produced from below by each of a plurality of test pieces including one of plates or columns forming voids, with lengthwise directions thereof in the horizontal direction, and the number of units where each test piece is formed in the lengthwise direction is at least one in one of a parallel or non-parallel state.

10. The three-dimensional molding method according to claim 7, further comprising the step of:

supporting partial regions of the part to be produced from below by each of a plurality of test pieces including one of plates or columns curved with lengthwise directions thereof in the horizontal direction and a slanted direction crossing the horizontal direction, and the number of units where each test piece is formed in the lengthwise direction is at least one in one of a parallel or non-parallel state.

11. The three-dimensional molding method according to claim 7, further comprising the step of:

supporting partial regions of the part to be produced from below by one test piece including one of a plate or a column, with a lengthwise direction thereof in the horizontal direction, and the number of units where each test piece is formed in the lengthwise direction is at least one in one of a parallel or non-parallel state.

12. The three-dimensional molding method according to claim 1, wherein the sintering step is followed by a molding step by a removal process on the sintered surface using a rotary tool.

13. The three-dimensional molding method according to claim 2, wherein the sintering step is followed by a molding step by a removal process on the sintered surface using a rotary tool.

14. The three-dimensional molding method according to claim 6, wherein the sintering step is followed by a molding step by a removal process on the sintered surface using a rotary tool.

* * * * *